United States Patent
Chen

(10) Patent No.: US 7,929,910 B2
(45) Date of Patent: Apr. 19, 2011

(54) PORTABLE ELECTRONIC APPARATUS WITH NEAR FIELD COMMUNICATION (NFC) APPLICATION AND METHOD OF OPERATING THE PORTABLE ELECTRONIC APPARATUS

(75) Inventor: Shou-Fang Chen, Hsin-Chu Hsien (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 771 days.

(21) Appl. No.: 11/459,010

(22) Filed: Jul. 20, 2006

(65) Prior Publication Data

US 2008/0032626 A1    Feb. 7, 2008

(51) Int. Cl.
*H04B 5/00* (2006.01)
(52) U.S. Cl. ............ 455/41.1; 455/572; 455/343.1
(58) Field of Classification Search ............ 455/41.1, 455/41.2, 66.1, 67.11, 550.1, 556.1, 572, 455/574, 343.1, 343.5
See application file for complete search history.

(56) References Cited

U.S. PATENT DOCUMENTS

| 7,215,976 B2 | 5/2007 | Brideglall | |
|---|---|---|---|
| 7,421,287 B2 * | 9/2008 | Cho et al. | 455/558 |
| 7,450,973 B2 * | 11/2008 | Choi et al. | 455/572 |
| 2004/0176032 A1 * | 9/2004 | Kotola et al. | 455/41.2 |
| 2006/0258289 A1 * | 11/2006 | Dua | 455/41.3 |

FOREIGN PATENT DOCUMENTS

CN    100351860 C    11/2007

\* cited by examiner

*Primary Examiner* — Lana N Le
*Assistant Examiner* — Ping Y Hsieh
(74) *Attorney, Agent, or Firm* — Winston Hsu; Scott Margo

(57) ABSTRACT

A portable electronic apparatus with NFC application and the method of operating the portable electronic apparatus are disclosed. The portable electronic apparatus includes an application module, an active NFC device, a passive NFC device, and a power supply unit. The application module is utilized for performing a main function of the portable electronic apparatus. The active NFC device which is coupled to the application module is utilized for communicating with an NFC device outside the portable electronic apparatus. The passive NFC device is utilized for communicating with an NFC device outside the portable electronic apparatus. The power supply unit which is coupled to the application module and the active NFC device is utilized for powering the application module and the active NFC device.

14 Claims, 5 Drawing Sheets

PORTABLE ELECTRONIC APPARATUS WITH NEAR FIELD COMMUNICATION (NFC) APPLICATION AND METHOD OF OPERATING THE PORTABLE ELECTRONIC APPARATUS

BACKGROUND OF INVENTION

1. Field of the Invention

The present invention relates to a portable electronic apparatus, especially to a portable electronic apparatus with an NFC application.

2. Description of the Prior Art

More and more electronic apparatus are embedded with near field communication (NFC) devices. For example, a cellular phone can be embedded with an RFID reader. Please refer to FIG. 1. FIG. 1 shows a cellular phone 100 embedded with an RFID reader. The cellular phone 100 comprises an RFID reader module 110 coupled to its corresponding antenna 120, a cellular phone module 130 coupled to its corresponding antenna 140, and a battery 150. The RFID reader module 110 comprises an RF interface 111, an RFID reader controller 112, and a storage unit 113. The cellular phone module 130 comprises a user interface circuit 131, a processing unit 132, a memory device 133 and an RF front 134.

The RFID reader module 110 is utilized to communicate with other NFC devices. For example, the user can use the cellular phone 100 to read RFID transponders or RFID tags on products to collect product information. In addition, the user can use the cellular phone 100 as a paying apparatus to enter a subway station or an MRT station in which an NFC device is set to check the user's identity. The RF interface 111 is utilized to receive and transmit RF signals through the antenna 120. The RFID reader controller 112 is utilized to process the received RF signal and generate signals to be transmitted by the RF interface 111. The storage unit 113 is coupled to the RF reader controller 112. The RF reader controller 112 accesses the storage unit 113 when necessary.

The cellular phone 130 comprises a user interface circuit 131 through with the user can manipulate the cellular phone 100. Signals received by the RF front 134 through the antenna 140 are then transmitted to the processing unit 132. The processing unit 132 also generates signals to be transmitted by the RF front 134. The memory device 133 is coupled to the processing unit. In the cellular phone module 130, the memory device 133 is usually the subscriber identity module (SIM) card of the cellular phone 100 in which a card number, a personal identity number, an identification code, and etc are stored. The processing unit accesses the memory device 133 to write data or obtain required information. Please note that the processing unit 132 is further couple to the RFID reader controller 112 of the RFID reader module 110. When a user uses the cellular phone as a paying apparatus to enter the station, the NFC device in the station requires checking the user information. Therefore, the data stored in the memory device 133 which is capable of representing the user should be sent to the NFC device in the station through the RFID reader module 110. As a result, the required information such as the SIM card number is read by the processing unit 132 and then written into the storage unit 113 under the control of the RFID reader controller 112.

The battery 150 powers the elements in both the RFID reader module 110 and the cellular phone module 130 through the power line. Since the RFID reader module 110 and the cellular phone module 130 share the same battery 150, once the battery 150 is empty, the entire cellular phone 100 including the RFID reader module 110 and the cellular phone module 130 is not working. This situation may be a risk happen to a user who uses the cellular phone 100 continuously after entering a station via a NFC check-in system. If the battery becomes empty before the user arrives at the destination, the user will have problem leaving the station.

SUMMARY OF INVENTION

It is therefore a primary objective of the claimed invention to provide a portable electronic apparatus with NFC application and the method of operating the portable electronic apparatus.

According to an embodiment of the claimed invention, a portable electronic apparatus is disclosed. The portable electronic apparatus includes an application module, an active NFC device, a passive NFC device, and a power supply unit. The application module is utilized for performing a main function of the portable electronic apparatus. The active NFC device which is coupled to the application module is utilized for communicating with an NFC device outside the portable electronic apparatus. The passive NFC device is utilized for communicating with an NFC device outside the portable electronic apparatus. The power supply unit which is coupled to the application module and the active NFC device is utilized for powering the application module and the active NFC device.

According to another embodiment of the claimed invention, a method of operating a portable electronic apparatus is disclosed. The portable electronic device includes an application module, an active NFC device, and a passive NFC device. The method includes: powering the application module and the active NFC device with a power supply unit; detecting a voltage of the power supply unit; and when the voltage of the power supply unit is not less than a threshold value, disabling the passive NFC device.

According to still another embodiment of the claimed invention, a portable electronic apparatus is disclosed. The portable electronic apparatus includes a power supply unit, a processing unit, a user interface circuit, an application unit, a memory device, an active NFC device controller, a passive NFC device controller, an RF interface, and a storage unit. The power supply unit is utilized for providing a voltage. The processing unit is coupled to the power supply unit. The user interface circuit which is coupled to the processing unit and the power supply unit is utilized for providing a user interface through which a user can manipulate the portable electronic apparatus. The application circuit is coupled to the processing unit and the power supply unit. The processing unit controls the application circuit to perform a main function of the portable electronic apparatus. The memory device which is coupled to the processing unit and the power supply unit is utilized for storing specific information. The active NFC device controller is coupled to the power supply unit and the processing unit. The RF interface which is coupled to the active NFC device controller, the passive NFC device controller and the power supply unit is utilized for receiving and transmitting RF signals. The storage unit which is coupled to the active NFC device controller, the passive NFC device controller and the power supply unit is utilized for storing data.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
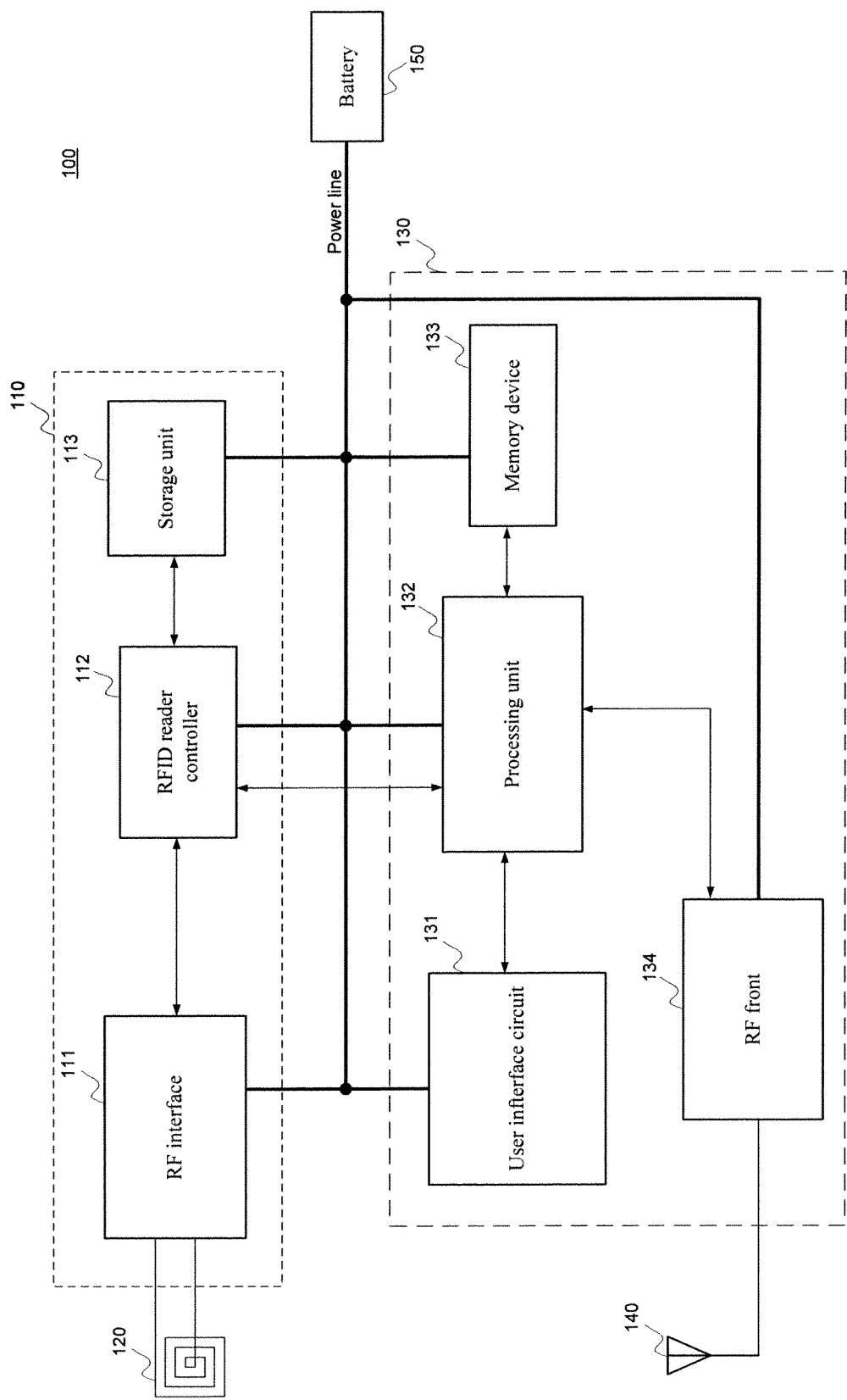
FIG. 1 shows a cellular phone embedded with an RFID reader.
Figure 2:
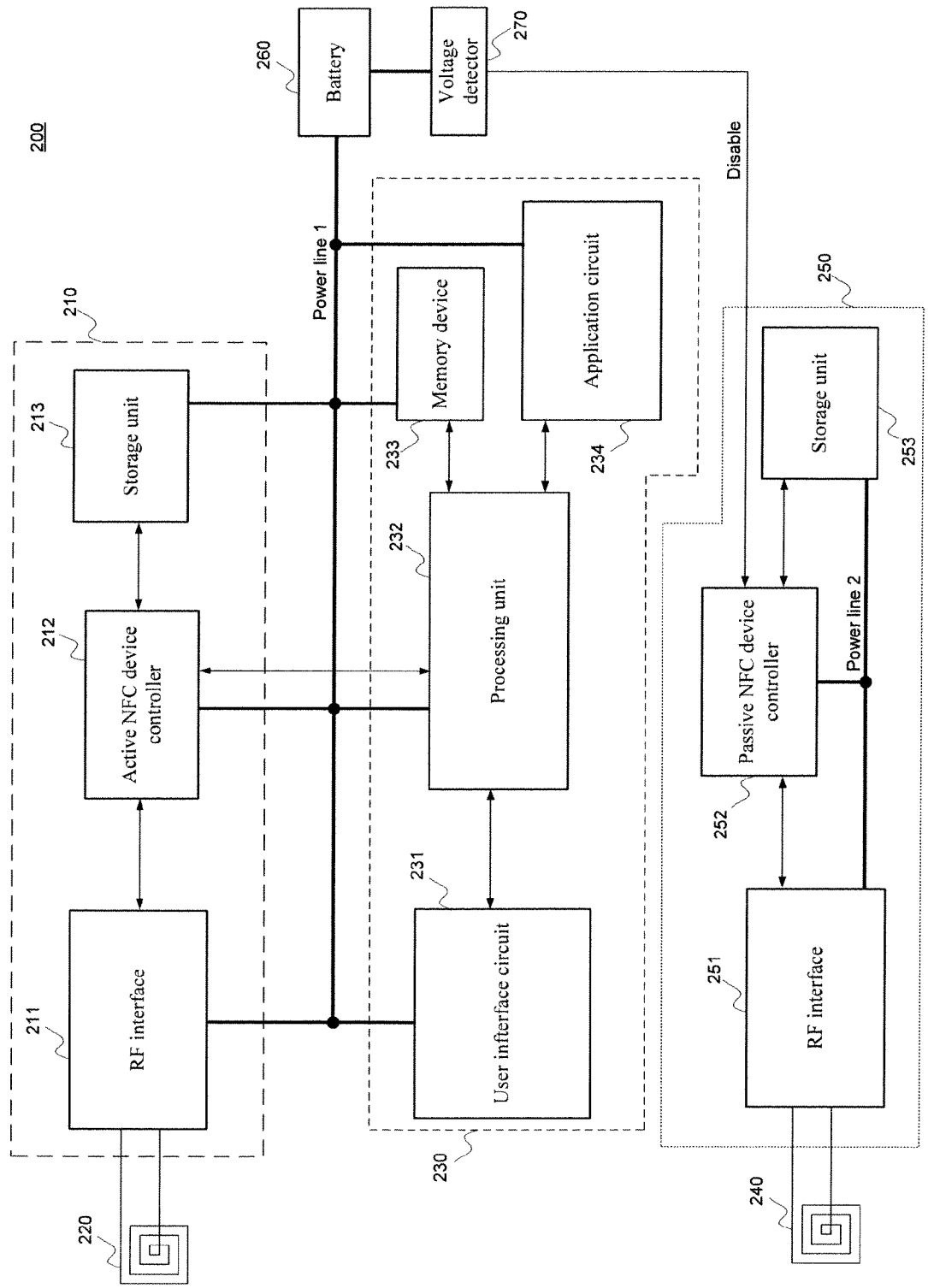
FIG. 2 shows a portable electronic apparatus with NFC application according to a first embodiment of the present invention.

Please refer to FIG. 2. FIG. 2 shows a portable electronic apparatus with NFC application according to a first embodiment of the present invention. The portable electronic apparatus 200 comprises an active NFC device 210, an application module 230, a passive NFC device 250, a battery 260 and a voltage detector 270. The active NFC device 210 and the passive NFC device 250 are respectively coupled to an antenna 220 and an antenna 240. The application module 230 is utilized for performing a main function of the portable electronic apparatus 200. For example, if the portable electronic apparatus is a cellular phone, the main function is receiving and transmitting electromagnetic waves which carry substantially voice signals. If the portable electronic apparatus is a PDA, the main function is computing, processing and storing data. The active NFC device 210 is coupled to the application module 230. The active NFC device 210 can communicate with an NFC device outside the portable electronic apparatus 200. Similarly, the passive NFC device 250 can communicate with an NFC device outside the portable electronic apparatus 200. The battery 260 is a power supply of the portable electronic apparatus 200 and is coupled to the application module 230 and the active NFC device 210. The battery 260 provides voltage to the application module 230 and the active NFC device 210 through power line 1. The voltage detector 270 is coupled to the battery 260 and the passive NFC device 250. The voltage detector 270 detects the voltage provided by the battery 260, and when the voltage of the battery 260 is not less than a threshold value, the voltage detector 270 sends a disable signal to the passive NFC device 250 to disable the passive NFC device 250. When the voltage of the battery 260 becomes lower than the threshold value, the voltage detector 270 stops sending the disable signal to the passive NFC device 250. As a result, the passive NFC device 250 is activated and therefore can perform its regular function.

The application module 230 comprises a user interface circuit 231, a processing unit 232, a memory device 233 and an application circuit 234. These four elements of the application module 230 are powered by the battery 260 through the power line 1. The processing unit 232 is utilized for processing data. The user interface circuit 231 provides a user interface through which a user can manipulate the portable electronic apparatus 200. The memory device 233 stores specific information, and the application circuit 234 performs the main function of the portable electronic apparatus 200 under the control of the processing unit 232. If the portable electronic apparatus 200 is a cellular phone, the memory device would be a subscriber identity module (SIM) card which stores the specific information such as a card number of the SIM card, a personal identity number, and an identification code.

The active NFC device 210 comprises an RF interface 211, an active NTC device controller 212, and a storage unit 213. These three elements of the active NFC device 210 are powered by the battery 260 through the power line 1. The RF interface 211 receives and transmits RF signals through the antenna 220. The active NTC device controller 212 is utilized to process the received RF signal and to generate signals to be transmitted by the RF interface 211. The storage unit 213 is utilized for storing data. The active NFC device controller 212 is also coupled to the processing unit 232 such that the application module 230 and the active NFC device 210 can transmit data to each other. One preferred embodiment of the active NFC device 210 is an RFID reader which can communicate with other NFC devices such as another RFID reader or an RFID transponder, i.e. an RFID tag.

The passive NFC device 250 comprises an RF interface 251, a passive NTC device controller 252, and a storage unit 253. The RF interface 251 receives and transmits RF signals through the antenna 240. The passive NFC device controller 252 is utilized to process the received RF signal and to generate signals to be transmitted by the RF interface 251. The storage unit 253 is utilized for storing data. The passive NFC device controller 252 comprises a supply voltage generator (not shown) coupled to the RF interface 251 and the storage unit 253. The supply voltage generator transforms the received RF signal into supply voltage and provides the supply voltage to the RF interface 251 and the storage unit 253 through the power line 2. The storage unit 253 can also stores the above-mentioned specific information. The passive NFC device controller 252 is also coupled to the voltage detector 270. When the voltage detector 270 determines the voltage of the battery 260 is not less than a threshold value, the voltage detector 270 generates a disable signal to disable the passive NFC device controller 252. When the voltage of the battery 260 becomes lower than the threshold value, the voltage detector 270 stops sending the disable signal to the passive NFC device controller 252. As a result, the passive NFC device controller 252 is activated can perform its regular function. One preferred embodiment of the passive NFC device 250 is an RFID transponder or an RFID tag which can communicate with other NFC devices such as an RFID reader.

Figure 3:
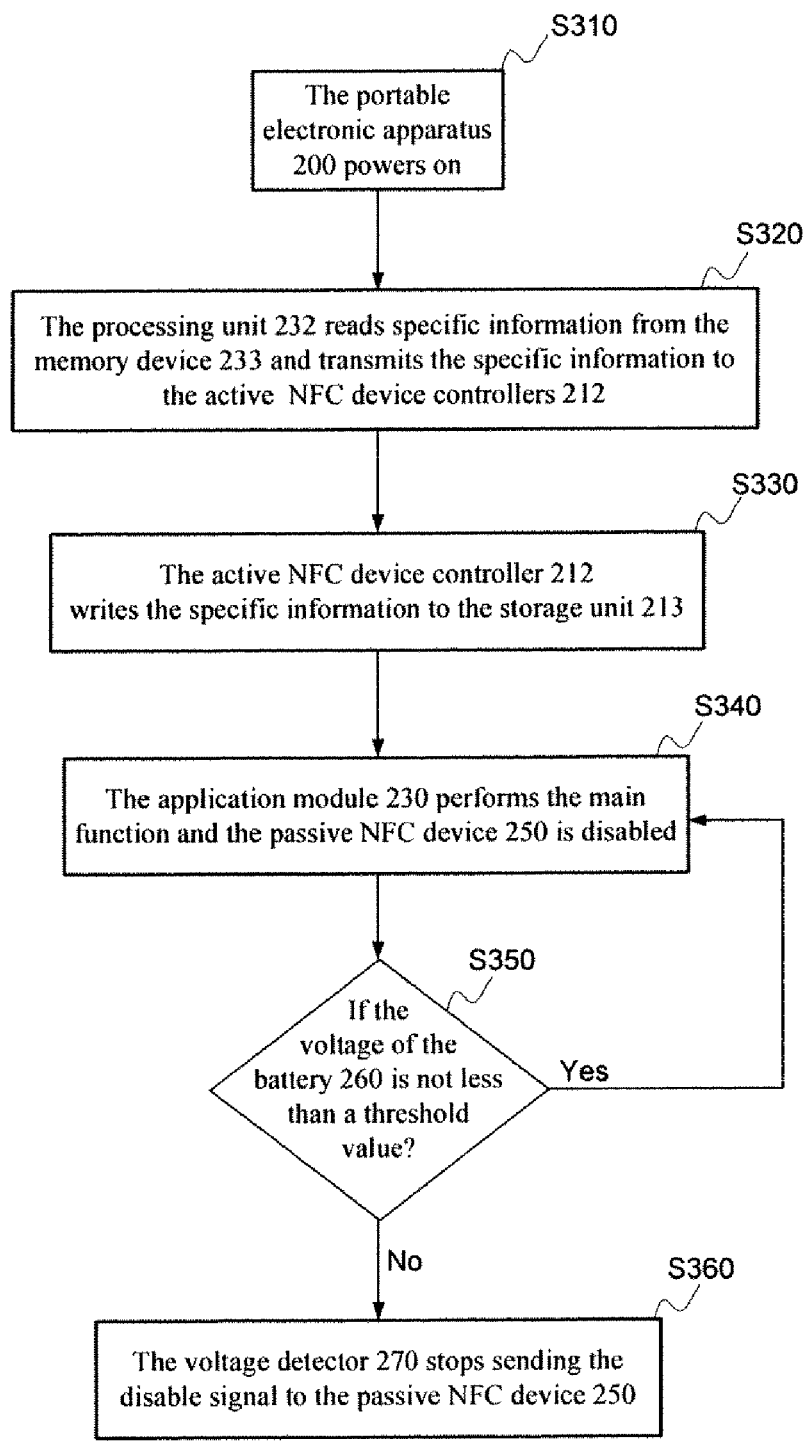
FIG. 3 shows a system flow chart of the portable electronic apparatus according to a first embodiment of the present invention.

Please refer to FIG. 3. FIG. 3 shows a system flow chart of the portable electronic apparatus 200 according to a first embodiment of the present invention. Initially, the portable electronic device 200 powers on (S310). Hereinafter a cellular phone is taken as an example of the portable electronic apparatus 200. Therefore, in step S310 the cellular phone is turned on. The processing unit 232 of the cellular phone then read the specific information from the memory device 233. In a cellular phone, the memory device 233 can be the SIM card, and the specific information can be the card number of the SIM card. The specific information is transmitted by the processing unit 232 to the active NFC device controller 212 (S320). The specific information is then stored in the storage unit 213 by the active NFC device controllers 212 (S330).

Afterwards, the application module 230 performs the main function of the portable electronic apparatus 200 and the passive NFC device 250 is still being disabled by the disable signal (S340). That is, for a cellular phone the application circuit 234 may be an RF front, and the processing unit 232 controls the RF front to receive and transmit electromagnetic waves that carry substantially voice signals. In addition, because the cellular phone is embedded with an active NFC device 210, the function of the active NFC device 210 is one of the main functions of the cellular phone. Then the voltage detector 270 detects the voltage of the battery 260 (S350). If the voltage is not less than a threshold value, the portable electronic apparatus continues performing the main function and the passive NFC device 250 keeps being disabled (S340); however, if the voltage is less than a threshold value, the voltage detector 270 stops sending the disable signal to the passive NFC device 250 (S360). As a result, even if the battery of the cellular phone is low, the cellular phone can still act as a passive NFC device to communicate with another NFC device.

Figure 4:
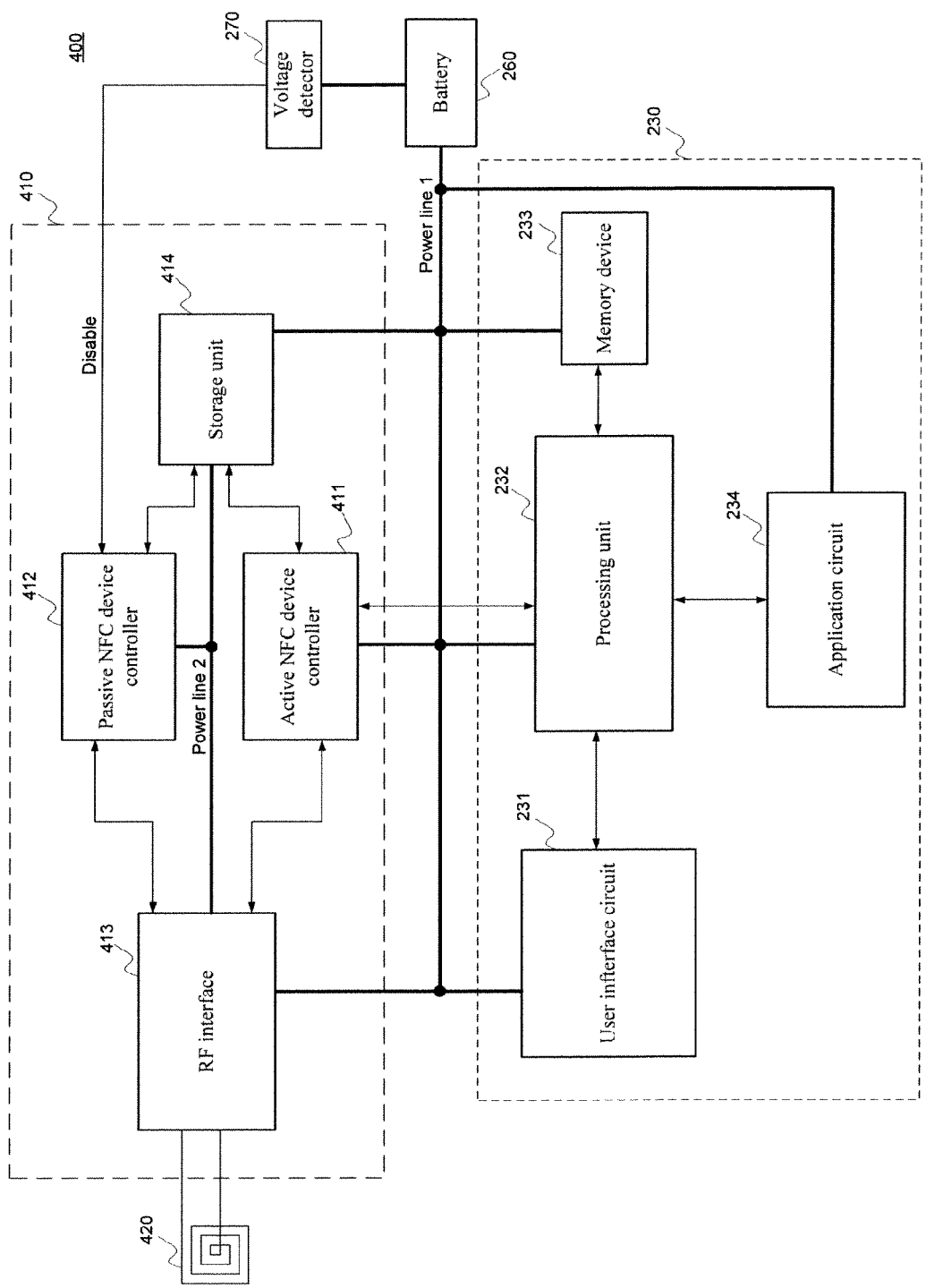
FIG. 4 shows a portable electronic apparatus with NFC application according to a second embodiment of the present invention.

Please refer to FIG. 4. FIG. 4 shows a portable electronic apparatus with NFC application according to a second embodiment of the present invention. The portable electronic apparatus 400 comprises an NFC device 410, the application module 230, the battery 260 and the voltage detector 270. The NFC device 410 is coupled to an antenna 420. The functions of the application module 230, the battery 260 and the voltage detector 270 are identical to the functions of corresponding elements with the same label shown in the first embodiment of the present invention. Therefore, for brevity the description of these elements is omitted. A preferred embodiment of the portable electronic apparatus 400 is a cellular phone, and the memory device 233 would be a SIM card which stores the specific information such as a card number of the SIM card, a personal identity number, and an identification code. If the portable electronic apparatus 400 is a cellular phone, an illustrative main function would be receiving and transmitting electromagnetic waves which carry substantially voice signals. The NFC device 410 can communicate with an NFC device outside the portable electronic apparatus 400 and comprises an active NEC device controller 411, a passive NFC device controller 412, an RF interface 413, and a storage unit 414. The active NFC device controller 411, the RF interface 413, and the storage unit 414 are powered by the battery 260 through the power line 1. The RF interface 413 is coupled to the antenna 420 for receiving and transmitting RF signals through the antenna 420. The RF interface 413 is also couple to the active NFC device controller 411 and the passive NFC device controller 412. The active NFC device controller 411 and the passive NFC device controller 412 are utilized to process the received RF signal and to generate signals to be transmitted by the RF interface 413. The storage unit 414 is utilized for storing data and is also couple to the active NFC device controller 411 and the passive NFC device controller 412. The active NFC device controller 411 is further coupled to the processing unit 232 such that the application module 230 and the NFC device 410 can transmit data to each other. One preferred embodiment of the active NFC device controller 411 is a controller of an RFID reader. As a result, the RF interface 413, the active NFC device controller 411, and the storage unit 414 can form an RFID reader that can communicate with other NFC devices such as another RFID reader or an RFID transponder. Similarly, one preferred embodiment of the passive NFC device controller 412 is a controller of an RFID transponder or an RFID tag. As a result, the RF interface 413, the passive NFC device controller 412, and the storage unit 414 can form an RFID tag that can communicate with other NFC devices such as an RFID reader.

The passive NFC device controller 412 comprises a supply voltage generator (not shown) coupled to the RF interface 413 and the storage unit 414. The supply voltage generator transforms the received RF signal into supply voltage and provides the supply voltage to the RF interface 413 and the storage unit 414 through the power line 2. The passive NFC device controller 412 is also coupled to the voltage detector 270. When the voltage detector 270 determines the voltage of the battery 260 is not less than a threshold value, the voltage detector 270 generates a disable signal to disable the passive NFC device controller 412. When the voltage of the battery 260 becomes lower than the threshold value, the voltage detector 270 stops sending the disable signal to the passive NFC device controller 412. As a result, the passive NFC device controller 412 is activated can perform its regular function.

Figure 5:
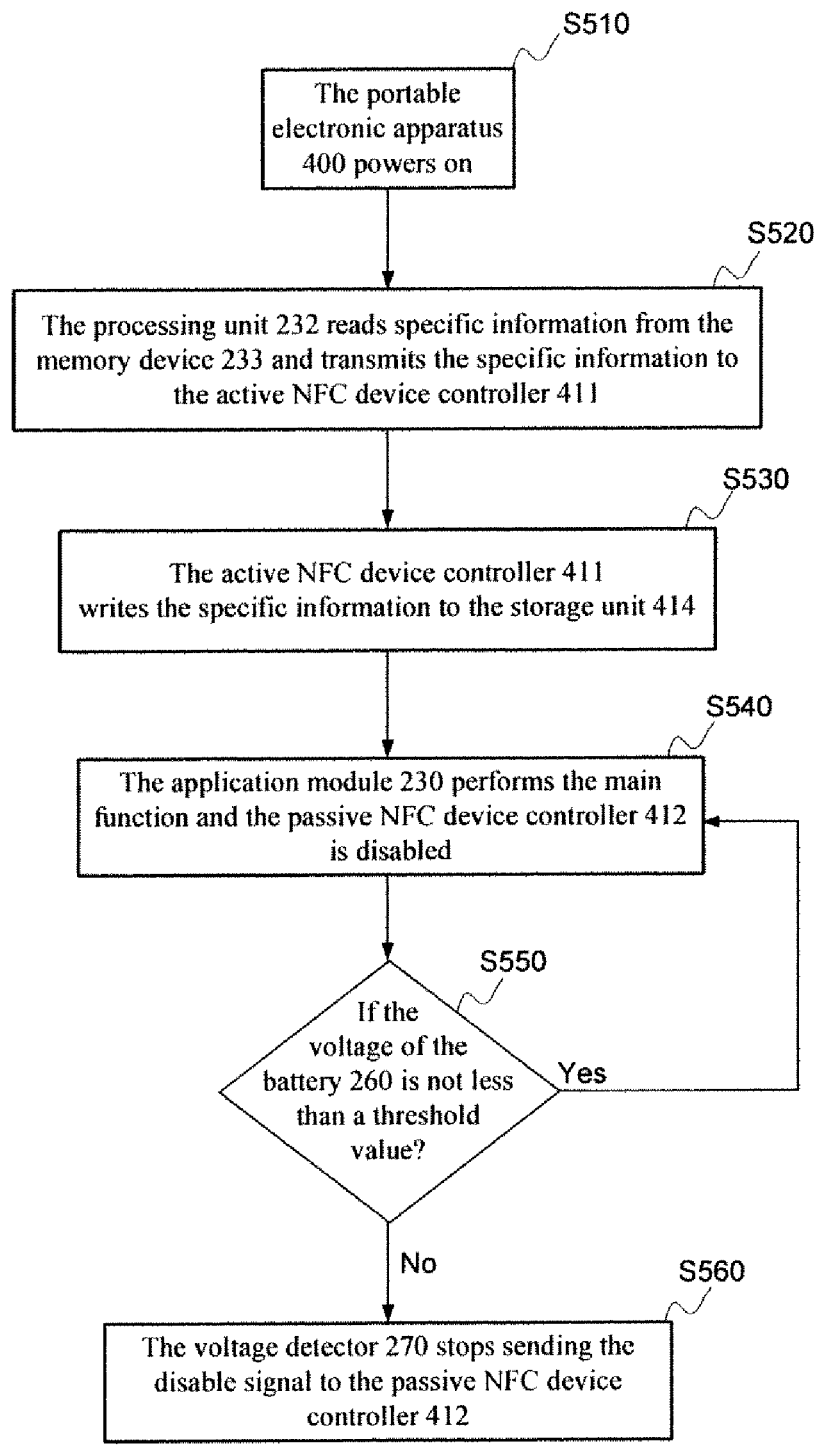
FIG. 5 shows a system flow chart of the portable electronic apparatus according to a second embodiment of the present invention.

Please refer to FIG. 5. FIG. 5 shows a system flow chart of the portable electronic apparatus 400 according to a second embodiment of the present invention. First, the portable electronic device 400 powers on (S510). Hereinafter a cellular phone is taken as an example of the portable electronic apparatus 400. Therefore, in step S510 the cellular phone is turned on. The processing unit 232 of the cellular phone then read the specific information from the memory device 233. In a cellular phone, the memory device 233 can be the SIM card, and the specific information can be the card number of the SIM card. The specific information is transmitted by the processing unit 232 to the active NFC device controller 411 (S520). The specific information is then stored in the storage units 414 by the active NFC device controllers 411 (S530). Afterwards, the application module 230 performs the main function of the portable electronic apparatus 400 and the passive NFC device controller 412 is still being disabled by the disable signal (S540). That is, for a cellular phone the application circuit 234 may be an RF front, and the processing unit 232 controls the RF front to receive and transmit electromagnetic waves that carry substantially voice signals. In addition, because the cellular phone is embedded with an NFC device 410, the function of the NFC device 410 is one of the main functions of the cellular phone. Then the voltage detector 270 detects the voltage of the battery 260 (S550). If the voltage is not less than a threshold value, the portable electronic apparatus 400 continues performing the main function and the passive NFC device controller 412 keeps being disabled (S540); however, if the voltage is less than a threshold value, the voltage detector 270 stops sending the disable signal to the passive NFC device controller 412 (S560). As a result, even if the battery of the cellular phone is low, the cellular phone can still act as a passive NFC device to communicate with another NFC device.

In summary, according to the present invention a portable electronic apparatus is embedded with two NFC devices. One NFC device is utilized to be an active device which is in operation when the battery of the portable electronic device is sufficient. The user can use the active NFC device to actively communicate with another NFC device to enter an MRT station. The other NFC device is utilized to be a passive device which can still be in operation when the battery of the portable electronic device is low. Consequently, the user can easily leave the station even if he runs out of the battery during his trip.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable electronic apparatus, comprising:
   an application module for performing a main function of the portable electronic apparatus and comprising:
      a processing unit;
      a user interface circuit coupled to the processing unit for providing a user interface through which a user can manipulate the portable electronic apparatus;
      an application circuit coupled to the processing unit wherein the processing unit controls the application circuit to perform the main function of the portable electronic apparatus; and
      a memory device coupled to the processing unit for storing specific information;
   an active near field communication (NFC) device coupled to the application module for communicating with an NFC device outside the portable electronic apparatus as both a RFID reader and a RFID tag and comprising:
      a first RF interface for receiving and transmitting RF signals;
      a first controller coupled to the RF interface and the processing unit for processing the RF signals; and
      a first storage unit coupled to the controller for storing data, wherein the data comprising the specific information transmitted from the memory device by the processing unit;
   a passive NFC device for communicating with an NFC device outside the portable electronic apparatus as a RFID tag and comprising:
      a second RF interface for receiving and transmitting RF signals;
      a second controller coupled to the RF interface and the processing unit for processing the RF signals; and
      a second storage unit for storing data the same as stored in the first storage;
   a power supply unit coupled to the application module and the active NFC device for powering the application module and the active NFC device, wherein the specific information is further stored in the second storage unit for being used by the passive NFC device to communicate with another NFC device or public transport when the active NFC device is not powered by the power supply unit; and
   a voltage detector coupled to the power supply unit and the passive NFC device for disabling the passive NFC device when the voltage of the power supply unit is not less than a threshold value.

2. The portable electronic apparatus of claim 1, wherein the portable electronic apparatus is a cellular phone and the main function is receiving and transmitting electromagnetic waves which carry substantially voice signals.

3. The portable electronic apparatus of claim 1, wherein the portable electronic apparatus is a cellular phone and the memory device is a subscriber identity module (SIM) card.

4. The portable electronic apparatus of claim 3, wherein the specific information is selected from the group consisting of a card number of the SIM card, a personal identity number, and an identification code.

5. The portable electronic apparatus of claim 1, wherein the active NFC device is an RFID reader.

6. The portable electronic apparatus of claim 1, wherein the active NFC device is an RFID reader.

7. The portable electronic apparatus of claim 1, wherein the active NFC device further comprises: an RF interface coupled to the power supply unit for receiving and transmitting RF signals; and a controller coupled to the RF interface and the power supply unit for processing the RF signals.

8. The portable electronic apparatus of claim 7, wherein the controller comprises a supply voltage generator coupled to the RF interface and the second storage unit for transforming the received RF signal into a supply voltage to power the RF interface and the second storage unit.

9. The portable electronic apparatus of claim 1, wherein the active NFC device and the passive NFC device comprise: an active NFC device controller coupled to the power supply unit; a passive NFC device controller; an RF interface coupled to the active NFC device controller, the passive NFC device controller and the power supply unit for receiving and transmitting RF signals; and a third storage unit coupled to the active NFC device controller, the passive NFC device controller and the power supply unit for storing data.

10. The portable electronic apparatus of claim 9, wherein the passive NFC device comprises a supply voltage generator coupled to the RF interface and the third storage unit for transforming the received RF signal into a supply voltage to power the RF interface and the third storage unit.

11. A portable electronic apparatus, comprising:
   a power supply unit for providing a voltage;
   a processing unit coupled to the power supply unit;
   a user interface circuit coupled to the processing unit and the power supply unit for providing a user interface through which a user can manipulate the portable electronic apparatus;
   an application circuit coupled to the processing unit and the power supply unit wherein the processing unit controls the application circuit to perform a main function of the portable electronic apparatus;
   a memory device coupled to the processing unit and the power supply unit for storing specific information;
   an active NFC device controller coupled to the power supply unit and the processing unit;
   a passive NFC device controller, which is always inactive, provided that the voltage of the power supply is not less than a threshold value;
   an RF interface coupled to the active NFC device controller, the passive NFC device controller and the power supply unit for receiving and transmitting RF signals; and
   a storage unit coupled to the active NFC device controller, the passive NFC device controller and the power supply unit for storing data; wherein the data comprising the specific information transmitted from the memory device by the processing unit, the processing unit transmits the specific information to the active NFC device controller and the specific information is stored in the storage unit for being used by the passive NFC device to communicate with another NFC device of public transport when the voltage of the power supply is less than the threshold; and
   a voltage detector coupled to the power supply unit and the passive NFC device for disabling the passive NFC device when the voltage of the power supply unit is not less than a threshold value.

12. The portable electronic apparatus of claim 11, wherein the portable electronic apparatus is a cellular phone and the main function is receiving and transmitting electromagnetic waves which carry substantially voice signals.

13. The portable electronic apparatus of claim 12, wherein the memory device is a subscriber identity module (SIM) card.

14. The portable electronic apparatus of claim 13, wherein the specific information is selected from the group consisting of a card number of the SIM card, a personal identity number, and an identification code.

* * * * *